Oct. 7, 1969
W. J. McNENNY
3,470,990
FRUIT LOWERING DEVICE
Filed Feb. 19, 1968
3 Sheets-Sheet 1
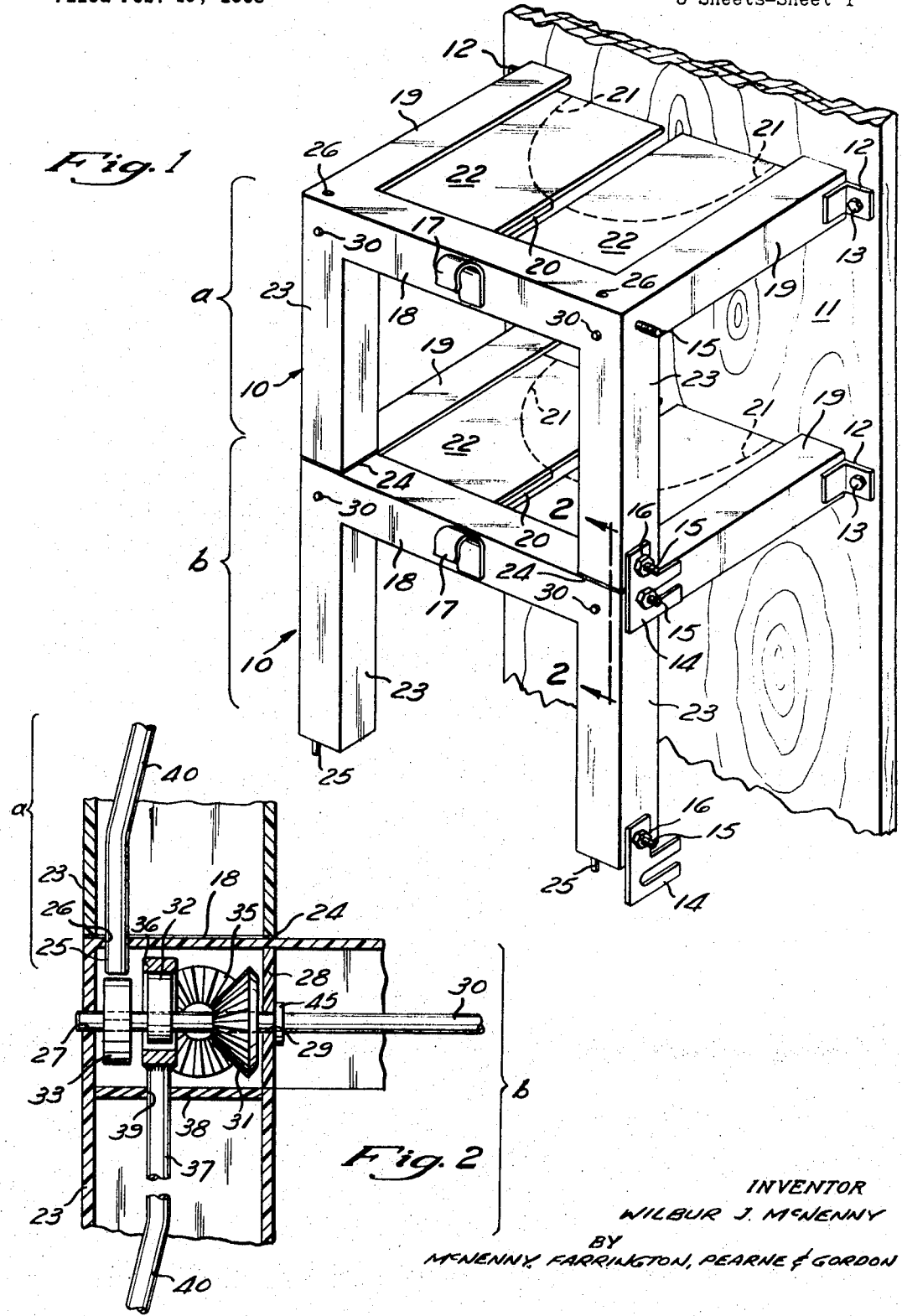
INVENTOR
WILBUR J. McNENNY
BY
McNENNY, FARRINGTON, PEARNE & GORDON
ATTORNEYS

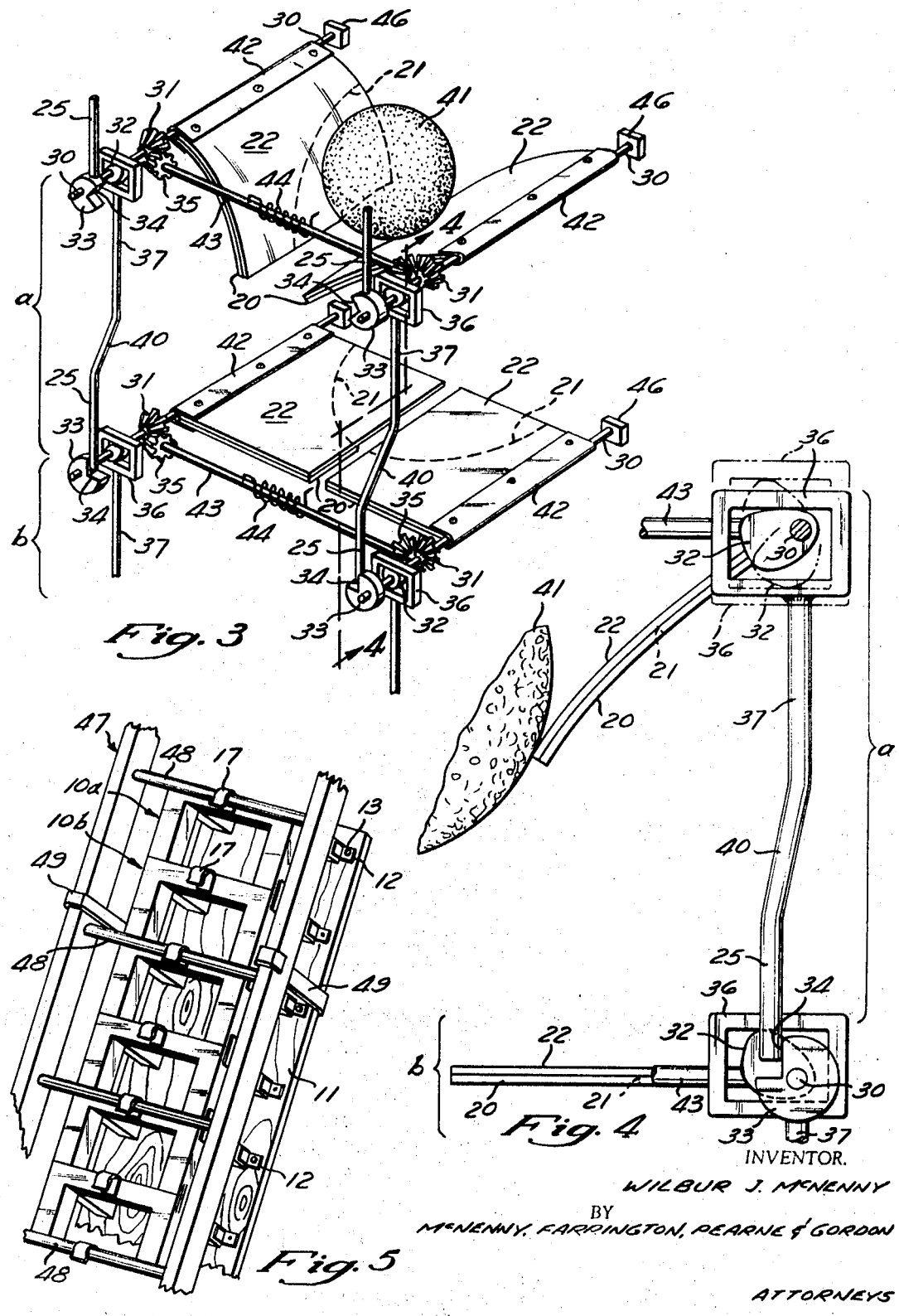

Oct. 7, 1969

W. J. McNENNY 3,470,990

FRUIT LOWERING DEVICE

Filed Feb. 19, 1968

INVENTOR.
WILBUR J. McNENNY
BY
McNENNY, FARRINGTON, PEARNE & GORDON
ATTORNEYS

United States Patent Office 3,470,990
Patented Oct. 7, 1969

3,470,990
FRUIT LOWERING DEVICE
Wilbur J. McNenny, P.O. Box 257,
Longwood, Fla. 32750
Filed Feb. 19, 1968, Ser. No. 710,433
Int. Cl. B65g 11/00, 11/20
U.S. Cl. 193—7
10 Claims

ABSTRACT OF THE DISCLOSURE

A fruit harvesting aid including a fruit lowering apparatus with a communicating series of vertically spaced modular stages secured to a slide and adapted to be mounted along a ladder, each stage being adapted to receive tender fruit and deliver it to the next lower module, each stage having a trap door assembly with a mechanical interconnection with the assemblies above and next below it for locking the upper door assembly substantially closed until the fruit has been released and the door assembly has closed, and simultaneously locking the lower next door assembly completely closed until the fruit has been deposited thereon and the door assembly next above it is closed. The fruit is lowered from the tree to the ground at a controlled dropping rate through successively lower modules without allowing the fruit to fall freely through any substantial distance.

BACKGROUND OF THE INVENTION

Reference should be made to applicant's copending application, "Fruit Picking Device," Ser. No. 616,309, filed Feb. 15, 1967.

The present invention relates generally to harvesting apparatus and more particularly to a tender fruit lowering apparatus which enables the picker to gather fruit from all parts of the tree and transfer it, without injury, from a substantially continuous series of vertically spaced picking levels to a convenient collecting and storage means at the ground level.

The standard procedure for picking tender fruit is for the picker to place a ladder against the tree, ascend the ladder with the carrying bag, pick the fruit starting from the top of the tree until the bag is filled, and descend the ladder to empty the bag. He then reascends the ladder as many times as necessary to pick the remaining fruit at lower levels in that location and then moves the ladder to the new location and repeats the process. The quantity of fruit that may be collected on each trip up and down the ladder is limited by the weight a person can support and the strength of the ladder.

PRIOR ART

Fruit gathering devices, or the like, have been made having a chute member which extends from the tree to the ground with interior obstructions or valves for retarding the movement of the articles placed therein in order to lessen the probability of damage to the articles in their transition from the tree to ground level.

Heretofore, the interruption of the descent of the fruit has been performed in a manner such that does not insure that the fruit will make its descent without forcibly bumping baffles or other descending pieces of fruit. Applicant's copending patent application entitled "Fruit Picking Device," Ser. No. 616,309, filed Feb. 15, 1967, relies on the bumping of two pieces of citrus fruit to push the lower fruit piece through flexible flaps in a controlled dropping manner. Citrus fruit, however, is more resistant to bruising than is tender fruit such as pears, peaches and apples.

The prior art for fruit gathering devices does not provide that each piece of fruit will be lowered without forcible impact with parts of the device or other fruit. The prior art thus is not adapted to lower tender fruit which may become bruised and damaged by contact of two or more pieces.

According to the present invention the modular fruit lowering device provides a means for gently lowering tender fruit in an expeditious manner through a series of mechanically interconnected stages which insures that each piece of fruit is lowered from the tree to a collecting level without falling freely, forcibly striking obstructions or coming into contact with other pieces of fruit.

SUMMARY OF THE INVENTION

The present invention provides a modular fruit lowering device adapted to be used with a ladder, gently lowering individual pieces of tender fruit from all levels of a tree to a collecting level near the ground. Each stage of the modular fruit lowering device has a trap door assembly which is mechanically interconnected with the stage above it to preclude the downward discharge of another piece of fruit to the reference stage until the trap door assembly of the reference stage is closed. While the trap door assembly of the reference stage is open, the next lower stage is mechanically locked so that the tender fruit is lowered at a controlled rate of one stage at a time and laid upon the next lower trap door without falling freely.

The illustrated preferred embodiment of the invention includes a vertical series of molded plastic frames which enclose the mechanical stage interconnections. The series of frames is mounted between a ladder and a planar fruit slide. A single trap door per stage having a soft rubber flap secured to a plastic stiffener is mounted on a cross axle provided with torsional springs spaced from each end to close the trap door. An integral stop, cam and eccentric pin control device, molded from high impact, low friction plastic, is mounted at each end of the cross axle. The eccentric pin part of each integral control device is engageably mated with a molded interstage locking strap made of the same material which extends through the top surface of the next lower stage and into engagement with the lower stage's mechanism.

In another illustrated embodiment, using similar molded frames secured to a slide and mounted on a ladder, a pair of trap doors of the same construction are used for each stage. In this embodiment the axles mounting the trap doors are interconnected for synchronism through a spring loaded transverse axle with bevel gears mounted at each of its ends. The transverse mounted bevel gears are each engaged with the bevel gear, stop, cam and eccentric pin control device mounted at one end of each trap door axle. The eccentric pin part of each device is engageably mated with an interstage locking strap which extends through the top surface of the next lower stage and into engagement with its synchronizing control mechanism.

A third embodiment illustrates a pair of trap doors per stage with a non-integral bevel gear, cam and sector wheel lock for interconnecting the contiguous stages.

In all of the illustrated embodiments of this invention, therefore, I provide a device which can be used to gently lower individual pieces of tender fruit by gravity, from tree level through successive interacting stages, to a collecting level near the ground.

The cost of manufacture of this device is low since the number of parts is minimized, and the modular design of identical stages provides for convenient and economical replacement without the necessity of buying an entire assembly.

OBJECTS OF THE INVENTION

The principal object of the present invention is to lower tender fruit by gravity, without injury to the fruit, from all points from the top to the bottom of the tree, so that the picker does not need to hold or support the fruit after it is picked, and all of the fruit within reach at one lateral location can be picked and safely lowered to the ground level during one trip up the ladder.

A further object is to reduce the cost of harvesting tender fruit by reducing both the amount of physical effort and the time required to pick all of the fruit from each tree by means of a simple, inexpensive apparatus which does not require skilled workers or a disproportionate capital investment.

A further object is to provide a simple mechancial device which gently lowers each piece of fruit through successively lower stages without the likelihood of its coming into contact with another piece of fruit during its descent.

Another object is to provide a modular fruit lowering device with identical replaceable stages.

Another object is to provide a modular fruit lowering device which can be mounted on a ladder and which can be lengthened by adding identical stages at either end.

Additional objects and advantages of the present invention will become apparent from the following description with respect to the accompanying drawings.

BRIEF DESCRIPTION OF THE DRAWINGS

FIGURE 1 is a perspective view of two interconnected stages of a modular fruit lowering device mounted on a fragmentary section of a planar slide;

FIGURE 2 is an enlarged fragmentary section along 2—2 of FIGURE 1 illustrating the interrelationship of mechanically engageable parts when the trap doors of both stages are in a closed position;

FIGURE 3 is a partial perspective view of two interconnected stages of a modular fruit lowering device illustrating the operation of the interstage locking mechanism when a piece of fruit is being discharged through the trap doors of one stage;

FIGURE 4 is an enlarged fragmentary view along 4—4 of FIGURE 3 illustrating the camming action of the upper stage as it locks the trap doors of the next lower stage;

FIGURE 5 is a partial perspective view of a modular fruit lowering device showing several stages secured to a planar slide and mounted on a ladder;

DESCRIPTION OF THE PREFERRED EMBODIMENT

Figure 8:
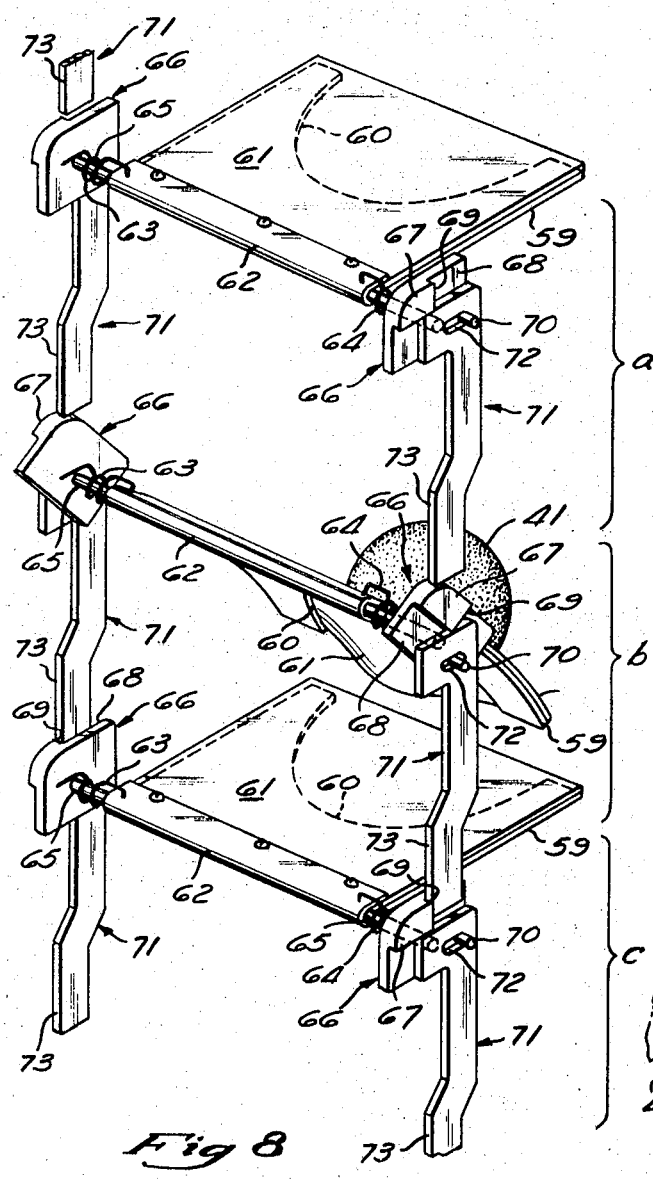
FIGURE 8 is a partial perspective view of a simplified and modified embodiment of the interlocking stages illustrating the interaction of three stages when a piece of fruit is being discharged through an intermediate stage.

FIGURES 1 through 5 illustrate a typical modular fruit lowering device with stages designated a and b. Hereinafter, the reference numerals used will be followed with a lower case letter, where appropriate, in order to distinguish the features or orientation of a particular stage.

In FIGURE 1, the fruit lowering modules 10a and 10b are mounted on a flat, smooth surface 11 having a width slightly greater than the width of the modules and a length determined by the number of modules used. The modules 10 are secured to the surface 11 by rear brackets 12 bonded to the horizontal frames 19 and fasteners 13; the modules are secured to each other at their vertical frames 23 by interstage brackets 14, lug bolts 15 and nuts 16. A mounting clamp 17 is bonded to the front face of the transverse frame 18 for attachment to the rungs of a ladder.

The transverse frames 18, the horizontal frames 19, and the vertical frames 23 of each module are preferably molded from plastic in order to avoid a dangerous shock hazard from overhead wires. The surface 11 may be a plane of plastic or wood since it is desirable to have a smooth surface on which the fruit will slide. The brackets 12 and 14, clamps 17, and lug bolts 15 may be made from any material suitable for bonding to plastic.

The transverse frames 18 and vertical frames 23 may have a box-like cross section and the horizontal frames 19 are L-sections. The L-section frames 19 are used in order not to restrict the rubber trap doors 22, supported by plastic stiffeners 20 secured to trap door axles 30, from pivoting to a vertically downward position.

One method of fabricating the modules is to mold an integral frame in two parts and bond them together after the interlocking mechanism (as shown in FIGURE 2) is in position. One part may consist of the front face of vertical frames 23a and the front and top face of transverse frame 18a along with the top face of horizontal frames 19a, and the other part may be the remainder of the frames. It should be understood that other combinations of faces for an integral frame and cover parts should be chosen to accommodate a particular embodiment of the interlocking mechanism disclosed herein.

A particular embodiment of the interlocking mechanism is illustrated in the fragmentary section of FIGURE 2. Trap door axle 30b is inserted through a bearing aperture 29b in a nylon bearing block 28b. The end of trap door axle 30b is inserted through an aperture 27b in the front face of vertical frame 23b. A bevel gear 31b, an eccentric cam 32b and a sector wheel 33b are shown mounted in a fixed position on trap door axle 30b near one end. Keyways and keys or other conventional methods may be used to lock them in position. Bevel gear 31b is shown in engagement with transverse bevel gear 35b, one of which is mounted at each end of transverse axle 43 (as shown in FIGURE 3).

A cam follower 36b is shown in section in engagement with the eccentric cam 32b. The lock shaft 37b of the cam follower 36b is inserted through a bearing aperture 39 in a guide block 38 made of nylon or other suitable low friction material and extends downwardly through vertical frame 23b.

Since the a module has an identical set of lock shafts 37a, the termination of the lock shaft is shown for the a module. An offset 40a extends from lock shaft 37a and terminates in lock bolt 25a which extends through an aperture 26b in the top surface of the transverse frame 18b. An interstage gasket 24 is provided to keep foreign particles out of the enclosed mechanism. The lock bolt 25a terminates with clearance above the cylindrical section of sector wheel 33b, and this is its position when the trap doors of the a module are closed (as in FIGURE 1).

FIGURES 3 and 4 illustrate the structure of the trap door assembly when a piece of fruit is being discharged through the trap doors of one stage.

Each of the rubber trap doors 22 in the illustrated embodiments is supported by plastic stiffeners 20, each of which is cut away as indicated at 21, so that the resistance to bending of the rubber trap doors 22 increases in the direction of its free end to the arcuate cutout 21.

In normal use, the modular fruit lowering device is inclined relative to a tree so that gravity tends to hold the fruit against the slide 11 (shown in FIGURE 5). The smaller sizes of falling fruit are deposited on the rubber trap doors 22 at their weakest positions and larger sizes of fruit encounter progressively increased stiffness from the flaps. This arrangement automatically compensates for the increased weight and momentum of the larger size fruit while allowing maximum flexibility for the smallest sizes.

Each rubber trap door 22 and its associated plastic stiffener 20 is centrally positioned on a trap door axle 30 and is rigidly fixed thereon with a longitudinal clamp 42 to prevent rotation or shifting on the axle. Rear bearing blocks 46 made from nylon or a similar material provide the bearing surface for the slide end of the trap door axle 30. The rear bearing blocks are bonded to the inner two surfaces of the L-section horizontal frames 19 to hold the door assemblies in position. Seals 45 are provided at the ladder end of the rubber trap doors 22 to keep foreign particulate matter out of the reciprocating mechanism.

The position of the trap doors in stage $a$ of FIGURES 3 and 4 illustrates the mechanical interlock between contiguous stages. The weight of the piece of fruit 41 forces the trap doors of stage $a$ to open downwardly. A torsion spring 44 is coiled around the transverse axle 43 with one end fastened to the transverse axle 43 and its opposite end fastened to the transverse frame 23. The tension of the spring controls the rate of opening of the trap doors. It should be understood that engagement of the trap door bevel gears 31 with the transverse bevel gears 35 provides synchronized movement of the trap doors. This synchronization assures that the piece of fruit 41 will be deposited with its weight evenly distributed on both trap doors 22 as it makes its descent to successively lower stages.

The eccentric cams 32 of stage $a$ are shown rotated at an angle substantially equal to the angular displacement of the trap doors 22a from their horizontally closed position. The eccentric cams 32a force the cam followers 36a downwardly, thereby forcing the lock bolts 25a into engagement with the vertically positioned locking surfaces 34b on sector wheels 33b. This action locks the trap door axles 30b, on which sector wheels 33b are fixed, and their associated trap doors 22b are locked horizontally closed. The trap doors 22b will remain closed and locked until the trap doors 22a have released the fruit 41 and have returned to their closed position by the spring return 44a.

The return of trap doors 22a to their closed position rotates eccentric cams 32a to move lock bolts 25a upwardly to release the cylindrical sector wheels 33b. Thus released, the sector wheels 33b, the trap door axles 30b, and the trap doors 22b are free to rotate and release the fruit downwardly depositing it on the locked doors of the stage below. It should be noted that the locking the doors of the stage $b$ while the fruit is on the doors of stage $a$, does not prevent the doors of a stage below $b$ from opening. Thus, if another fruit were deposited on a stage below stage $b$ simultaneously with the deposit of fruit on stage $a$, the lower fruit would be released simultaneously with the fruit of stage $a$. The effect of this arrangement allows pickers at successively lower vertical levels to deposit fruit in the stages at their level simultaneously without adversely affecting the lowering operation at other stages, provided there is at least a one stage separation between simultaneous deposits.

Referring again to FIGURE 3, lock bolts 25 of a stage above stage $a$ are shown in engagement with the cylindrical surfaces of sector wheels 33a. The vertically downward displacement of these lock bolts 25 indicates that there is a piece of fruit on the doors of this next higher stage because a small clearance is provided if there is no fruit (as shown in FIGURE 2). Because of this engagement, the trap doors of this next higher stage are not free to swing downwardly to release the fruit until the doors of stage $a$ return to their closed position. Only then are the lock bolts 25 able to move downwardly adjacent to the then vertical locking surfaces 34a on sector wheels 33a.

It should be understood that this interaction of stage $a$, as shown, with the next higher stage precludes the release of fruit from the next higher stage while fruit is being released from stage $a$. Fruit on successively higher stages will also not be released because the small angular displacement of the sector wheels 33 of the stage next above $a$ will prevent its release. However, if there is no fruit on the stage next above $a$, but there is a piece of fruit on a successively higher stage, it will be released through the interim stages until it reaches the stage next above $a$ and will be held there only until the doors of stage $a$ have closed as described.

Simply stated, fruit may be placed on any stage of the device when the trap doors of that stage and the stage next above it are closed, without the likelihood of bumping two pieces of fruit during its controlled descent from the tree to a ground collecting point.

FIGURE 5 shows six stages secured to a flat wood slide 11 and mounted on a ladder 47. The mounting clamps 17 are clipped over the ladder rungs 48, and ladder brackets 49 secure the assembly to prevent transverse shifting with respect to the ladder. A pair of mounting clamps 17, symmetrically located about the center of each stage, and clipped over the ladder rungs, is a suggested alternative manner of mounting the device.

The width of the stages is shown to be less than the width of a ladder rung 48. The vertical height of each stage is shown to be half of the distance between successive ladder rungs. Although the physical size of the device shown is not necessarily essential, successful operation has been achieved with horizontal distance between trap door axles 30 of one stage equal to the vertical distance between trap door axles of contiguous stages.

Figure 6:
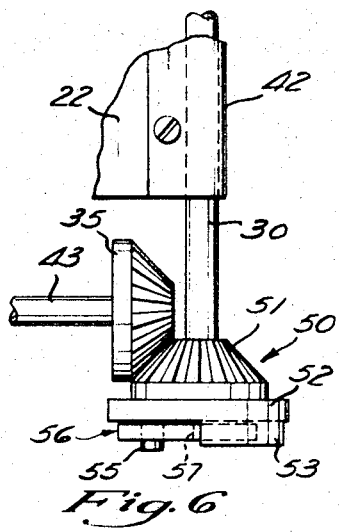
FIGURE 6 is a fragmentary plan view of another embodiment of the interconnecting assembly illustrating an integral bevel gear, stop, and eccentric pin synchronizing control device.
Figure 7:
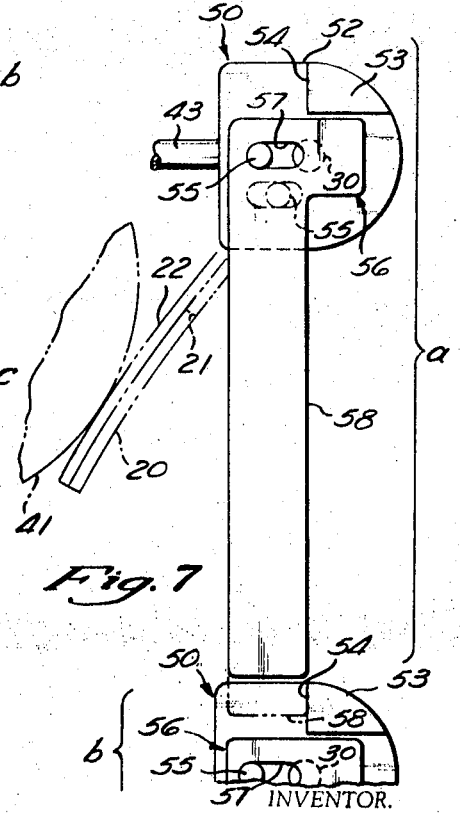
FIGURE 7 is a fragmentary front view of the embodiment of FIGURE 6 illustrating the locking action when a piece of fruit is being discharged through one stage.

FIGURES 6 and 7 illustrate another embodiment of the interconnecting assembly. The function of this assembly is to provide interstage locking which is functionally equivalent to the interstage locking described for FIGURES 2, 3 and 4.

A synchronizing control device 50 is an integral unit which is substituted for bevel gear 31, eccentric cam 32 and sector wheel 33. The integral unit 50 may be produced by injection molding of a low friction material. The integral unit 50 has a bevel gear portion 51, a face plate portion 52, a stop portion 53 and an eccentric pin portion 55.

The integral unit 50 is mounted at the end of the trap door axle 30 carrying the rubber trap door 22. The bevel gear portion 51 engages with transverse bevel gear 35 mounted at the end of transverse axle 43. This engagement is primarily for synchronization of the trap doors.

FIGURE 7 is a front view illustrating the integral unit 50a with the eccentric pin portion 55a inserted through a slot 57a in a mating follower interlock strap 56a. The locking edge 58a is positioned above the vertical locking surface 54b of the integral unit 50b. This represents the orientation of the integral units 50a and 50b when there is no fruit resting on their respective trap doors. When a piece of fruit 41 is placed on the doors of stage $a$ the (as shown by dashed lines) door swings downwardly forcing the integral unit 50a fixed to trap door axle 30a to rotate a substantially equal angle. The eccentric pin portion 55a forces the follower interlock strap 56a downwardly to engage its locking edge 58a to engage with the locking surface 54b. The result is that the doors of stage $b$ are locked during the time that the doors of stage $a$ are open. The doors of the stage next above $a$ are not free to open when the doors of stage $a$ are open because the arcuate surface of stop portion 53a has rotated under the lower edge of the follower interlock strap 56 of the stage next above $a$.

Tracing the interstage locking operation again reveals that fruit may be placed on any stage of the device when the trap doors of that stage and the stage next above it are closed. The fruit so placed has a controlled descent and does not bump other fruit similarly placed on a stage.

A simplified embodiment of the invention is illustrated in FIGURE 8. A single trap door per stage is used in this embodiment with its fixed end pivoting with the transverse axle 65. A rubber trap door 61 and supporting plastic stiffener 59 are secured to transverse axle 65 with a transverse clamp 62. The plastic stiffener 59 has an arcuate cutout as indicated at 60. The resistance to bending of the rubber trap door 61 increases in the direction of its free end to the arcuate cutout 60. This feature of the trap door automatically compensates for the increased weight and momentum of the larger size fruit while allowing maximum flexibility for the smallest sizes. Other methods for obtaining trap door flexibility may be used such as increasing the thickness of rubber in a direction toward the fixed end of the trap door.

Torsion spring 63 and 64 are coiled around the transverse axle 65 near each end. One end of each spring 63 and 64 is fastened to the transverse axle 65 and the other end of each spring is fastened to the transverse frame 18. The tension of the springs controls the rate of drop of the fruit through the trap door and closes the door when the fruit has cleared the free end of the trap door and slide surface. Since the modular fruit lowering device is inclined relative to a tree, gravity tends to hold the fruit against the slide.

This embodiment uses an integral interlock control unit 66 which is similar to the integral unit 50 shown in FIGURES 6 and 7. One important distinction is that there is not a bevel gear portion 51 in this embodiment. The reason for its absence is that with a single trap door per stage, synchronization of a single stage has no relevance. The control units 66 may be produced by injection molding a low friction material.

The control units 66 are fixed to each end of the transverse axle 65. Each integral control unit 66 has a stop portion 67, and an eccentric pin portion 70 molded to a face plate portion 68.

The eccentric pin portion 70 is inserted through a slot 72 in an interstage strap 71. The locking edge 73 of the interstage strap is spaced above the vertical locking surface 69 of the stop portion 67 of the next lower stage when the door of the upper stage is closed and there is no fruit resting on it.

When a piece of fruit is deposited on the door of stage b as illustrated in FIGURE 8, the door swings downwardly, thereby engaging locking edge 73b with vertical locking surface 69c to lock the door of stage c. The arcuate surface of stop portion 67b is in a position to engage the bottom edge of interstage strap 71a in order to prevent the door of stage a from moving downwardly. It should be understood that the bottom edge of interstage strap 71a would not actually engage the arcuate surface of stop portion 67b unless there was a piece of fruit on stage a and the door of stage b was not yet closed.

Tracing the interstage locking operation again reveals that the operation of locking and releasing of stages are the same as for the other embodiments disclosed. Pickers may deposit fruit simultaneously on any stage of the device when the door of that stage and the stage next above it is closed, without the likelihood of bumping two pieces of fruit during its controlled descent from the tree to a ground collecting point.

Although a preferred embodiment of this invention is illustrated, it is to be understood that various modifications and rearrangements of parts may be resorted to without departing from the scope of the invention disclosed.

What is claimed is:

1. Harvesting apparatus comprising modular lowering means adapted to be supported alongside a tree with said modular lowering means having a vertical extent from a ground-supported collector to near the top of the tree, spaced openings communicating with the interior of said modular lowering means over its entire vertical extent, a slide means to which one side of said modular lowering means is fastened for its entire vertical extent, and a series of obstructions each communicating with the interior of said modular lowering means and arranged to guide articles dropped therein into successively lower modules, means for locking alternate upper and lower spaced obstructions actuated by the deposit of an article on an intermediate obstruction, the spacing between said obstructions being sufficiently short to gently lower the articles and to enable a person picking from said three adjacent said modular lowering means to reach said obstructions through one of said openings from any vertical position throughout the length of said modular lowering means.

2. Harvesting apparatus as set forth in claim 1 including a ladder adapted to be leaned against a tree, and means connecting said modular lowering means to said ladder to support said modular lowering means between the ladder and the tree.

3. Article lowering apparatus comprising guiding means adapted to be supported in a generally upright position and defining a downwardly extending passage, a plurality of vertically spaced door means movably mounted on said guiding means, biasing means normally biasing each of said door means into closed position blocking said passage, each of said door means being adapted to be moved into open position by the weight of an article placed thereon to deliver such article to the next lower door means, locking means for locking each of said door means against movement to its open position, each of said locking means being actuated by the next higher door means so as to be in locking position when the next higher door means is moved toward open position and to be released when the next higher door means is closed.

4. Article lowering apparatus comprising guiding means adapted to be supported in a generally upright position and defining a downwardly extending passage, a plurality of vertically spaced door means movably mounted on said guiding means, biasing means normally biasing each of said door means into closed position blocking said passage, each of said door means being adapted to be moved into open position by the weight of an article placed thereon, to deliver such article to the next lower door means, locking means for locking each of said door means against movement to its open position, each of said locking means being actuated by the next lower door means so as to be in locking position when the next lower door means is moved toward open position and to be released when the next lower door means is closed.

5. Article lowering apparatus as set forth in claim 4 in which each of said locking means in locking position permits limited movement of its associated door means toward open position to actuate the locking means for the next higher door means into locking position.

6. Article lowering apparatus as set forth in claim 4 wherein each of said locking means when in released position is actuated by opening movement of its associated door means into position to lock the next lower door means against opening movement.

7. Modular lowering means comprising a plurality of trap door stages spaced along the interior of said modular lowering means, said trap door stages including a trap door axle and resilient flap means fixed thereon and extending into the interior of said modular lowering means and adapted to be flexed downwardly, means for mechanically synchronizing said spaced trap door stages, said mechanically synchronizing means including an integral control device and an interstage strap, said integral control device being engageable with said interstage strap to lock closed said upper and lower spaced trap door stages while said intermediate trap door stage is open.

8. The modular lowering means of claim 7 wherein said mechanically synchronizing means includes a transverse axle and transverse bevel gears mounted at each end of said transverse axle, and said integral control device has a molded bevel gear, eccentric pin and stop elements and is secured to one end of each of two said trap door axles, said transverse bevel gear being engaged with said molded bevel gear elements to synchronize motion of said trap doors of one stage, said eccentric pin and stop elements being engageable with said interstage strap to synchronize locking of said upper and lower spaced trap door stages while said intermediate trap door stage is open.

9. The modular lowering means of claim 7 wherein said integral control device has a molded eccentric pin and stop elements and is secured to both ends of said trap door axle, said eccentric pin and stop elements being engageable with said interstage strap to synchronize locking of said upper and lower spaced trap door stages while said intermediate trap door stage is open.

10. Article lowering apparatus comprising guiding means adapted to be supported in a generally upright position and defining a downwardly extending passage, a plurality of vertically spaced door means movably mounted on said guiding means, biasing means normally biasing each of said door means into closed position blocking said passage, each of said door means being adapted to be moved into open position by the weight of an article placed thereon to deliver such article to the next lower door means, locking means for locking each of said door means against movement to its open position, each of said locking means being actuated by the next higher door means so as to be in locking position when the next higher door means is moved toward open position and to be released when the next higher door means is closed, and each of said locking means being further actuated by the next lower door means so as to be in locking position when the next lower door means is moved toward open position and to be released when the next door means is closed.

References Cited
UNITED STATES PATENTS

| | | | |
|---|---|---|---|
| 2,193,942 | 3/1940 | Shackelford | 193—32 |
| 2,374,864 | 5/1945 | Hawes | 193—7 |
| 2,644,564 | 7/1953 | Bassoff | 193—40 |
| 2,647,670 | 8/1953 | Cox | 193—7 |
| 2,842,243 | 7/1958 | Neidhardt | 193—40 |

ANDRES H. NIELSEN, Primary Examiner

U.S. Cl. X.R.
193—32, 40